United States Patent

Lin

[11] Patent Number: 5,810,380
[45] Date of Patent: Sep. 22, 1998

[54] BICYCLE FRONT FORK PACKING STRUCTURE

[76] Inventor: Wen-Hwa Lin, No. 812, Chan Shen Rd., Tiah Shen Tsun, Wei Pu Hsiang, Taichung Hsien, Taiwan

[21] Appl. No.: 702,129

[22] Filed: Aug. 23, 1996

[51] Int. Cl.⁶ ................................................. B62K 21/18
[52] U.S. Cl. ......................... 280/279; 74/551.1; 403/370
[58] Field of Search .................................... 280/279, 280; 74/551.1; 403/370, 371; 384/538, 540

[56] References Cited

U.S. PATENT DOCUMENTS

| | | | |
|---|---|---|---|
| 5,291,797 | 3/1994 | Chi | 74/551.1 |
| 5,332,245 | 7/1994 | King | 280/279 |
| 5,496,126 | 3/1996 | Lin | 403/370 |
| 5,540,457 | 7/1996 | Johnson | 74/551.1 |
| 5,544,905 | 8/1996 | Chen | 280/279 |
| 5,681,119 | 10/1997 | Maui | 280/279 |

FOREIGN PATENT DOCUMENTS 2384668  11/1978  France ................................. 280/279

*Primary Examiner*—Anne Marie Boehler
*Attorney, Agent, or Firm*—Varndell Legal Group

[57] ABSTRACT

A bicycle front fork packing structure including a tapered ball bearing mounted around the top coupling tube of the front fork and connected between the vertical tube of the handlebar stem and the head tube and having a tapered center through hole, a tapered screw cap threaded onto the externally threaded bottom end of the vertical tube of the handlebar stem and covering the tapered ball bearing and having an inside annular groove, a split packing ring mounted within the tapered screw cap and the ball bearing and forced into engagement between the head tube and the top coupling tube of the front fork and having an outside annular flange forced into engagement with the inside annular groove of the tapered screw cap.

1 Claim, 3 Drawing Sheets

BICYCLE FRONT FORK PACKING STRUCTURE

BACKGROUND AND SUMMARY OF THE INVENTION

The present invention relates to bicycle front fork packing devices adapted for securing the top coupling tube of the front fork of a bicycle to the head tube thereof, and relates more particularly to such a bicycle front fork packing structure which is inexpensive to manufacture, and easy to install.

A regular bicycle front fork packing device is generally comprised of a locating socket mounted around the top coupling tube of the front fork, supported on a ball bearing above the head tube of the bicycle frame, and having an outer thread and a tapered center through hole, a split holding-down ring fitted into the tapered center through hole of the outer thread of the locating socket to compress the holding-down ring by forcing an inside annular flange thereof into an outside annular groove on the holding-down ring, causing the holding-down ring and the locating socket to securely fix the front fork to the head tube. This structure of bicycle front fork packing device is functional, however the design of the outer thread of the locating socket and the annular groove of the holding-down ring complicates the manufacturing process of the bicycle front fork packing device, thereby causing the manufacturing cost to be high.

The present invention provides a bicycle front fork packing structure which is inexpensive to manufacture, and easy to install. According to the preferred embodiment of the present invention, the bicycle front fork packing structure comprises a tapered ball bearing mounted around the top coupling tube of the front fork and connected between the vertical tube of the handlebar stem and the head tube, having a tapered center through hole; a tapered screw cap threaded onto the externally threaded bottom end of the vertical tube of the handlebar stem and covered on the tapered ball bearing, having an inside annular groove; and a split packing ring mounted within the tapered screw cap and the ball bearing and forced into engagement between the head tube and the top coupling tube of the front fork, having an outside annular flange forced into engagement with the inside annular groove of the tapered screw cap.

DETAILED DESCRIPTION OF THE PREFERRED EMBODIMENT

Figure 1:
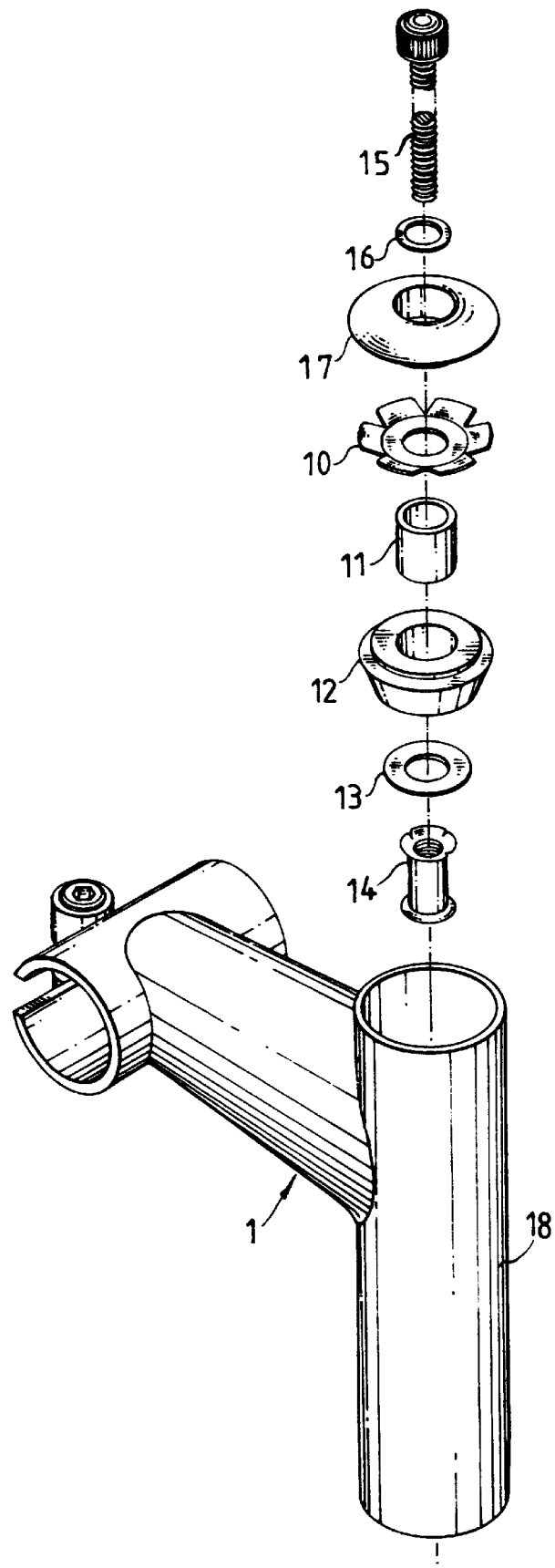
FIG. 1 is an exploded view of a handlebar stem packing structure according to the present invention.
Figure 3:
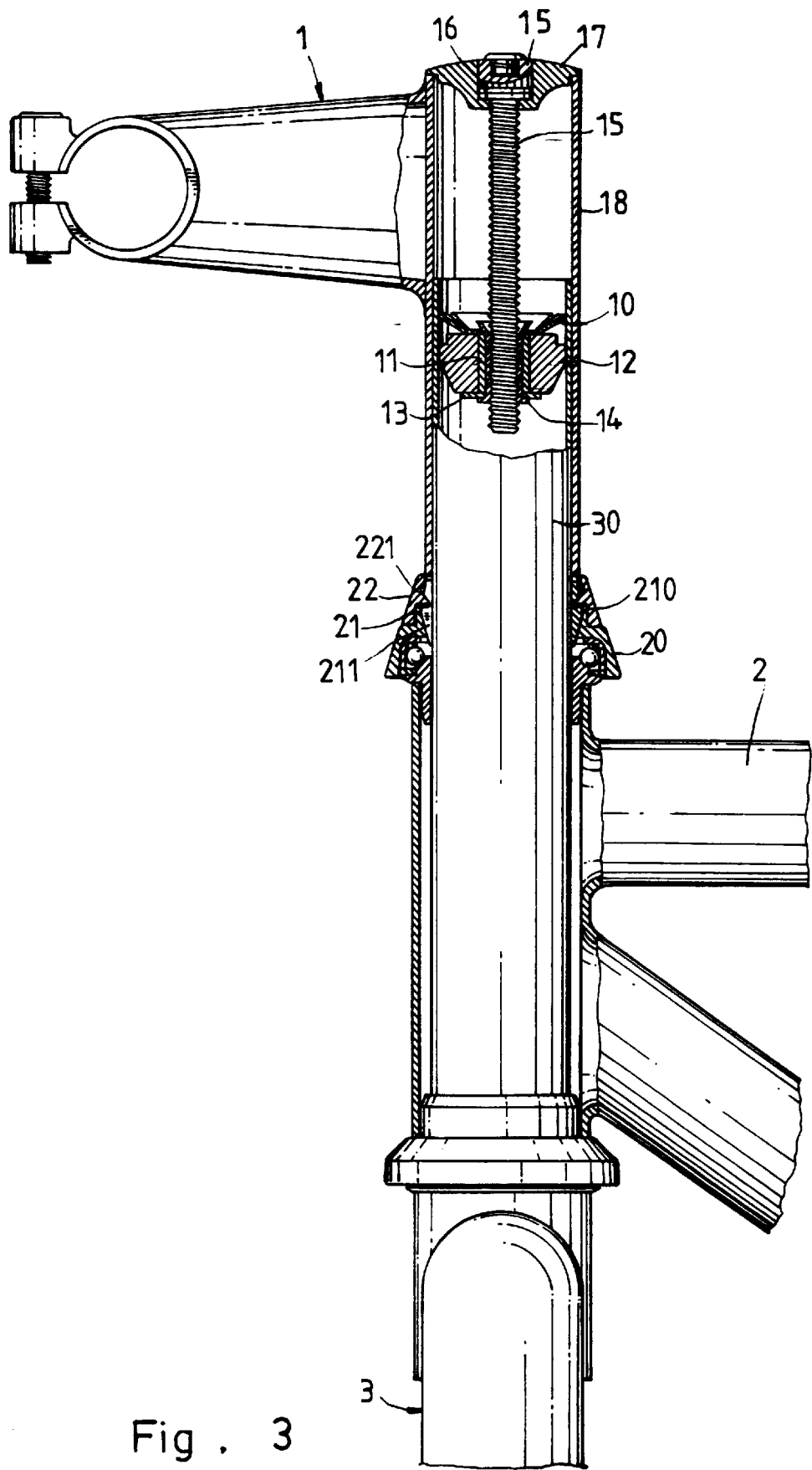
FIG. 3 is a sectional assembly view of FIG. 2.

Referring to FIGS. 1 and 3, the top coupling tube 30 of the front fork 3 is inserted through the head tube 2 from the bottom into the vertical tube 18 of the handlebar stem 1, and secured in place by a handlebar stem packing device, which is comprised of a hollow cone 12 fitted into the top coupling tube of the front fork 3, a bush 11 mounted within the hollow cone 12, a rivet-like female screw 14 mounted in the bush 11 and having two headed opposite ends stopped outside the bush 11, a washer 13 mounted around the rivet-like female screw 14 at the bottom of the hollow cone 12, a locating plate 10 mounted around the rivet-like female screw 14 above the hollow cone 12, a cap 17 covered on the top open end of the vertical tube 18 of the handlebar stem 1, a screw 15 inserted through the center hole of the cap 17 and threaded into the rivet-like female screw 14 and turned to force the hollow cone 12 and the locating plate 10 into tight engagement with the inside wall of the top coupling tube 30 of the front fork 3, and a packing ring 16 mounted around the screw 15 and retained between the head of the screw 15 and the cap 17.

Figure 2:
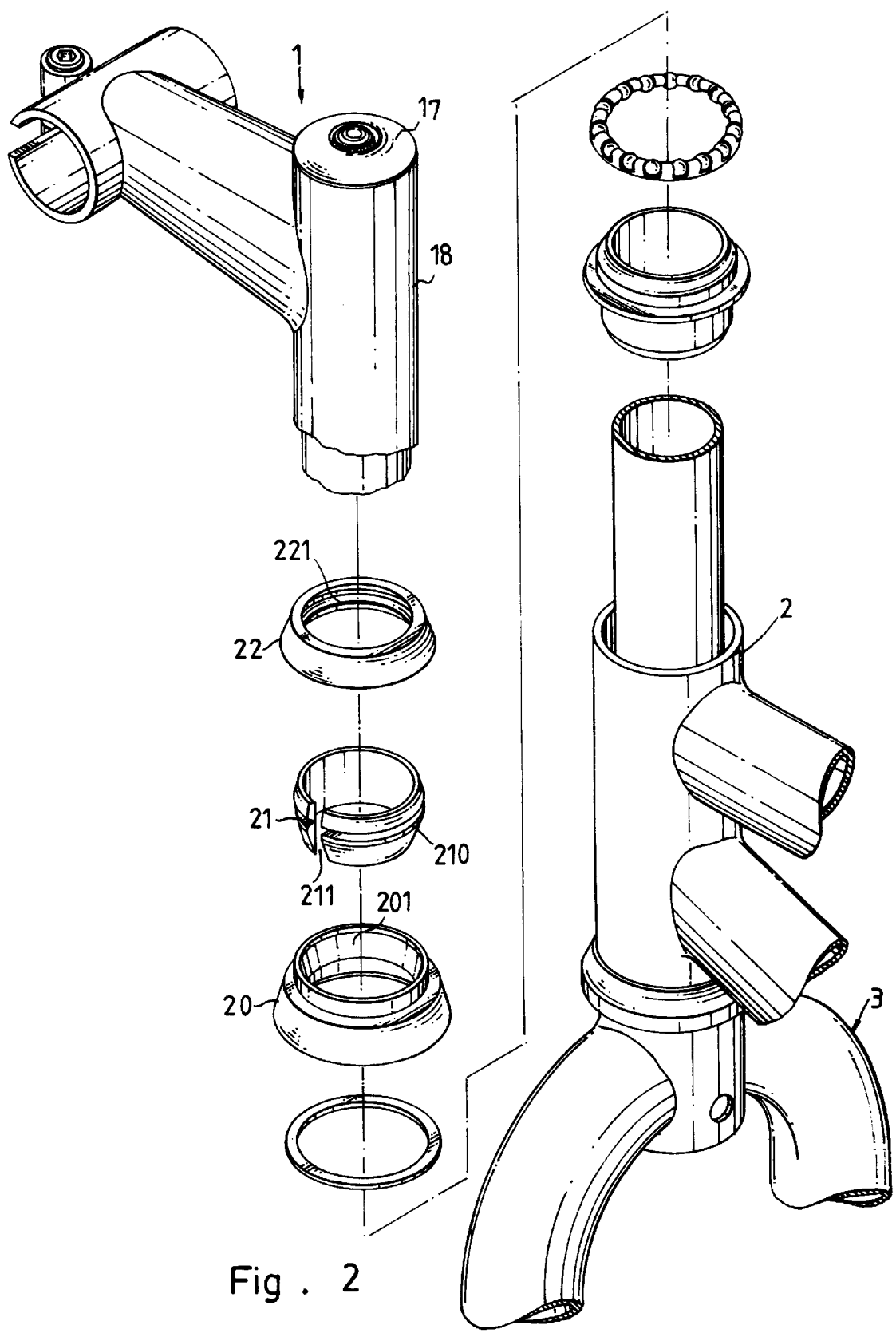
FIG. 2 is an exploded view of a bicycle front fork packing structure according to the preferred embodiment of the present invention.

Referring to FIGS. 2 and 3, the front fork packing device which securely fix the top coupling tube 30 of the front fork 3 to the head tube 2, is comprised of a ball bearing 20, a split packing ring 21, and a tapered screw cap 22.

The ball bearing 20 is mounted around the top coupling tube 30 of the front fork 3 and connected between the vertical tube 18 of the handlebar stem 1 and the head tube 2, having a tapered center through hole 201, which has a diameter gradually reducing toward the bottom. The split packing ring 21 has a split 211, and an outside annular flange 210 raised around the peripery. The screw cap 22 has an inside annular groove 221 fitting the outside annular flange 210 of the split packing ring 21. When in use, the split packing ring 21 is mounted within the screw cap 22 and secured thereto by forcing the outside annular flange 210 into engagement with the inside annular groove 211, then the screw cap 22 is threaded onto the externally threaded bottom end of the vertical tube 18 of the handlebar stem 1 and covered on the ball bearing 20, permitting the bottom end of the split packing ring 21 to be forced into the space between the outside wall of the top coupling tube 30 of the front fork 3 and the inside wall of the head tube 2. When installed, the downward pressure of the handlebar stem 1 causes the split packing ring 21 to be firmly engaged between the head tube 2 and the top coupling tube 30 of the front fork 3.

What is claimed is:

1. A bicycle front fork packing structure comprising:

a tapered ball bearing mounted around a top coupling tube of a bicycle front fork and connected between a vertical tube of a bicycle handlebar stem and a bicycle head tube, having a tapered center through hole, which has a diameter gradually reducing toward said bicycle head tube;

a tapered screw cap threaded onto an outer thread on the vertical tube of said bicycle handlebar stem at a bottom side and covering said tapered ball bearing, said tapered screw cap having an inside annular groove; and a split packing ring mounted within said tapered screw cap and said ball bearing and forced in between said bicycle head tube and the top coupling tube of said bicycle front fork, said split packing ring having a longitudinal split and an outside annular flange forced into engagement with the inside annular groove of said tapered screw cap.

* * * * *